(12) United States Patent
Wang

(10) Patent No.: US 7,600,902 B2
(45) Date of Patent: Oct. 13, 2009

(54) LIGHTING HANDLE OF CAR

(76) Inventor: Ming-Cheng Wang, 235 Chung-Ho, Box 8-24, Taipei (TW)

( * ) Notice: Subject to any disclaimer, the term of this patent is extended or adjusted under 35 U.S.C. 154(b) by 0 days.

(21) Appl. No.: 12/325,260

(22) Filed: Nov. 30, 2008

(65) Prior Publication Data

US 2009/0147528 A1 Jun. 11, 2009

(30) Foreign Application Priority Data

Dec. 5, 2007 (TW) .............................. 96220587 U

(51) Int. Cl.
*B60Q 1/26* (2006.01)
(52) U.S. Cl. ...................... 362/501; 362/545
(58) Field of Classification Search ................. 362/501, 362/487, 543–545
See application file for complete search history.

(56) References Cited

U.S. PATENT DOCUMENTS

2007/0086201 A1* 4/2007 Wang .......................... 362/501
2007/0195542 A1* 8/2007 Metros et al. ................ 362/501
2007/0258258 A1* 11/2007 Wang .......................... 362/501
2007/0263401 A1* 11/2007 Shi ............................. 362/501

* cited by examiner

*Primary Examiner*—Laura Tso

(57) ABSTRACT

A lighting handle of a car comprises a handle body having a recess at an inner surface thereof; a light emitting device being installed at an inner side of the recess of the handle body; the light emitting device including: a seat installed with a supporting surface; one side of the supporting surface being formed with an inserting groove; a circuit board installed on the supporting surface of the seat; the circuit board being installed with a plurality of lighting emitting bodies; the circuit board having a power wire for connecting other electric circuit in a car; and a transparent lamp cover installed on the seat; an inner wall of the cover being a reflecting surface; one side of the cover having a protrusion which has passed through the through hole of the circuit board to be inserted into the inserting groove of the seat.

3 Claims, 5 Drawing Sheets

LIGHTING HANDLE OF CAR

FIELD OF THE INVENTION

The present invention relates to handles, in particular to a lighting handle of a car, which has lights at the handle so that the lateral sides of the car can provide the alert effect. Thus, peoples or drivers near the lateral sides of the car can have the alert about the states of the car from the lighting handle of the car.

BACKGROUND OF THE INVENTION

Generally, the handles of car doors are used for opening or closing the doors. The lights of cars are installed at the front or rear sides of the cars and thus the alert effect is limited at the front and rear sides. No alert is provided at the lateral sides of the cars. Therefore, for the people or cars at the lateral sides, no alert is provided and they can not keep attention to the movement of the cars. Thus, they feel danger in driving. As a result, there is an eager demand for resolving this problem.

SUMMARY OF THE INVENTION

According, the main object of the present invention is to provide a device which increases the alert effect at the lateral sides of the car. This function is especially used as the car changes direction.

To achieve above object, the present invention provides a lighting handle of a car, comprising: a handle body having a recess at an inner surface thereof; the recess having a long via hole at a middle section thereof; each of two ends of the recess having a post; a light emitting device being installed at an inner side of the recess of the handle body; the light emitting device including; a seat installed with a supporting surface; one side of the supporting surface being formed with an inserting groove; each of two ends of the supporting surface having a combining hole which is screwed to the post of the recess by using a screw; a circuit board installed on the supporting surface of the seat; the combining hole being corresponding to the inserting groove of the supporting surface; the circuit board being installed with a plurality of lighting emitting bodies; the circuit board having a power wire for connecting other electric circuit in a car; and a transparent lamp cover installed on the seat; an inner wall of the cover being a reflecting surface; one side of the cover having a protrusion which has passed through the through hole of the circuit board to be inserted into the inserting groove of the seat.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
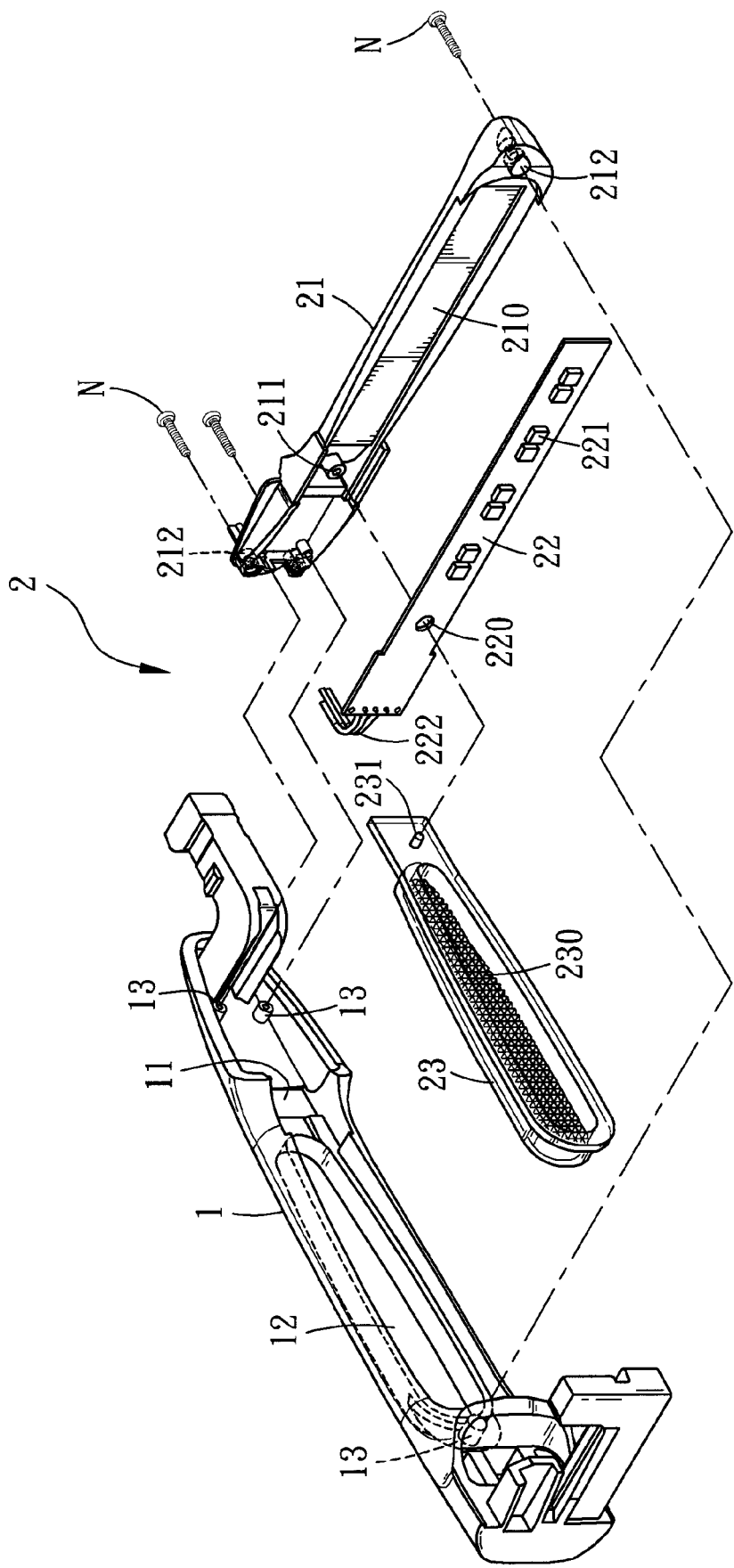
FIG. 1 is an exploded perspective view of the present invention.

Referring to FIG. 1, the present invention mainly has the following elements.

A handle body 1 has a recess 11 at an inner surface thereof. The recess 11 has a long via hole 12 at a middle section thereof. Each of two ends of the recess 11 has a post 13.

A light emitting device 2 is installed at an inner side of the recess 11 of the handle body 1. The light emitting device 2 includes the following elements. A seat 21 is installed with a supporting surface 210. One side of the supporting surface 210 is formed with an inserting groove 211. Each of two ends of the supporting surface 210 has a combining hole 212 which is screwed by the post 13 in the recess 11 by using a screw N. A circuit board 22 is installed on the supporting surface 210 of the seat 21. The combining hole 212 is corresponding to the inserting groove 211 of the supporting surface 210. The circuit board 22 is installed with a plurality of lighting emitting bodies 221. Each lighting emitting body 221 is an LED (light emitting diode) lamp. The LED lamps include blue lamps and yellow lamps. The circuit board 22 has a power wire 222 for connecting other electric circuit in a car. A transparent lamp cover 23 is installed on the seat 21. An inner wall of the cover 23 is a saw-teeth like reflecting surface 230. One side of the cover 23 has a protrusion 231 which has passed through the through hole 220 of the circuit board 22 to be inserted into the inserting groove 211 of the seat 21.

Figure 2:
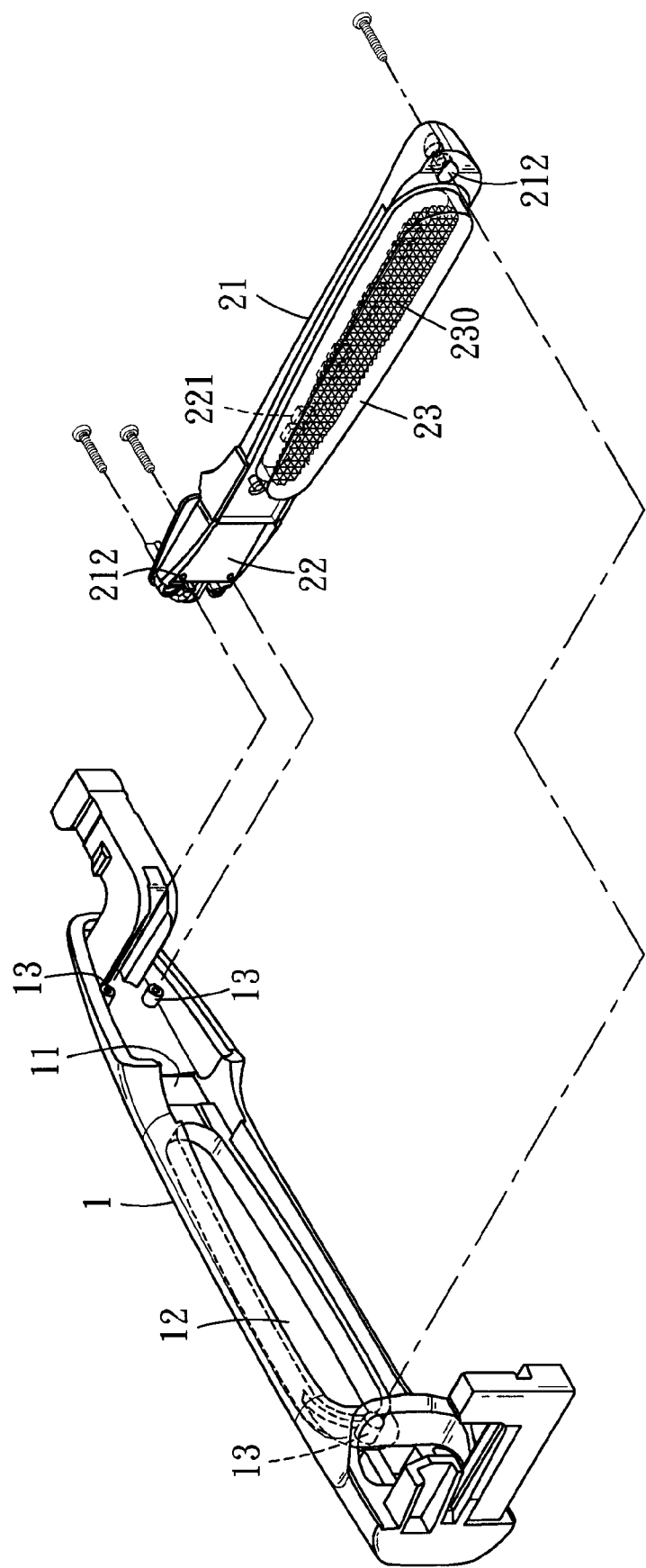
FIG. 2 is an exploded view showing the assembled light emitting device and the handle body.
Figure 3:
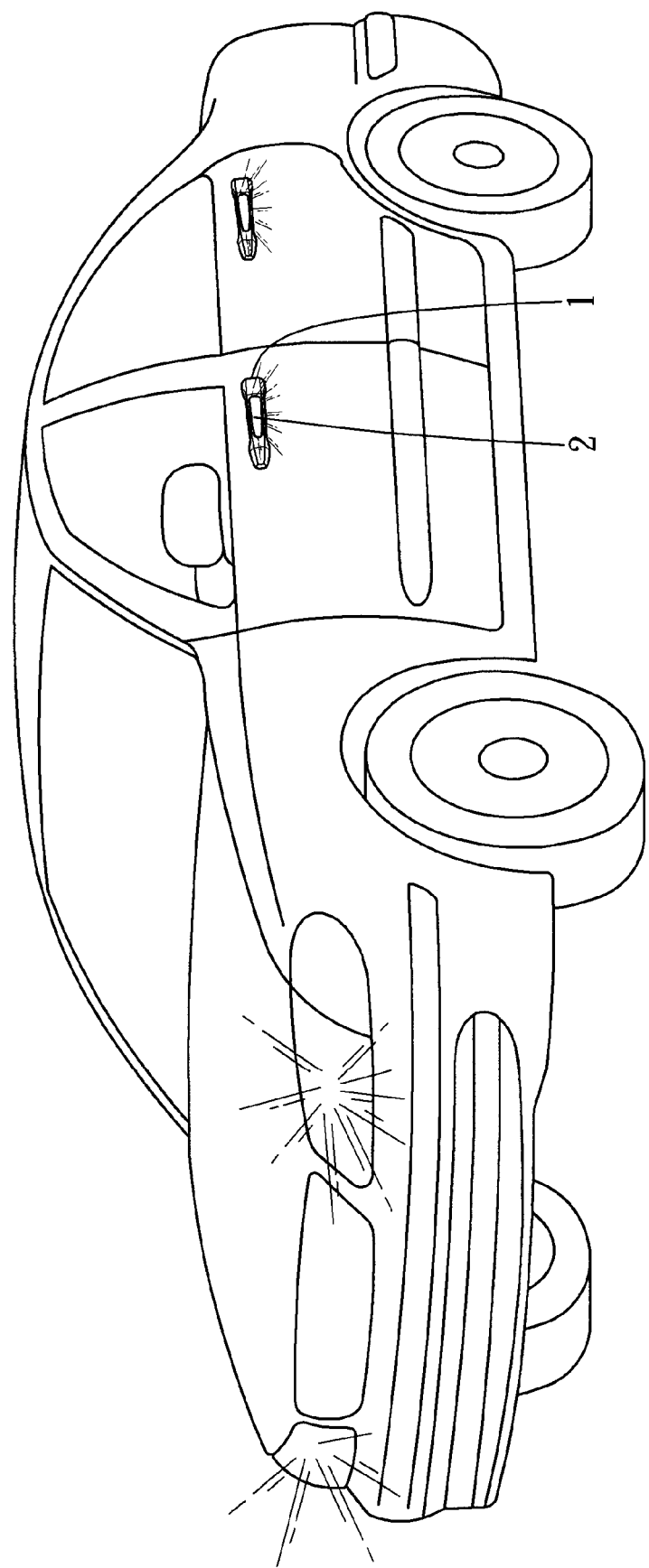
FIG. 3 shows the use of the present invention.

In assembly, referring to FIGS. 1 to 3, firstly, the light emitting device 2 is assembled. The circuit board 22 is placed upon the supporting surface 210 of the seat 21. The through hole 220 of the circuit board 22 is aligned to the inserting groove 211 of the seat 21. Then the protrusion 231 of the transparent cover 23 passes through the through hole 220 of the circuit board 22 and then inserts into the inserting groove 211 of the seat 21 so that the cover 23 covers upon the seat 21. Then the structure is combined by high frequency combination. Than a light emitting device 2 is assembled. Then the light emitting device 2 is installed to the recess 11 of the handle body 1. Then a part of cover 23 passes through the via hole 12 of the handle body 1 and the combining holes 212 at two ends of the seat 21 are combined with the posts 13 at two ends of the handle body 1 by using screws N. Thus the assembly work is complete.

Figure 4:
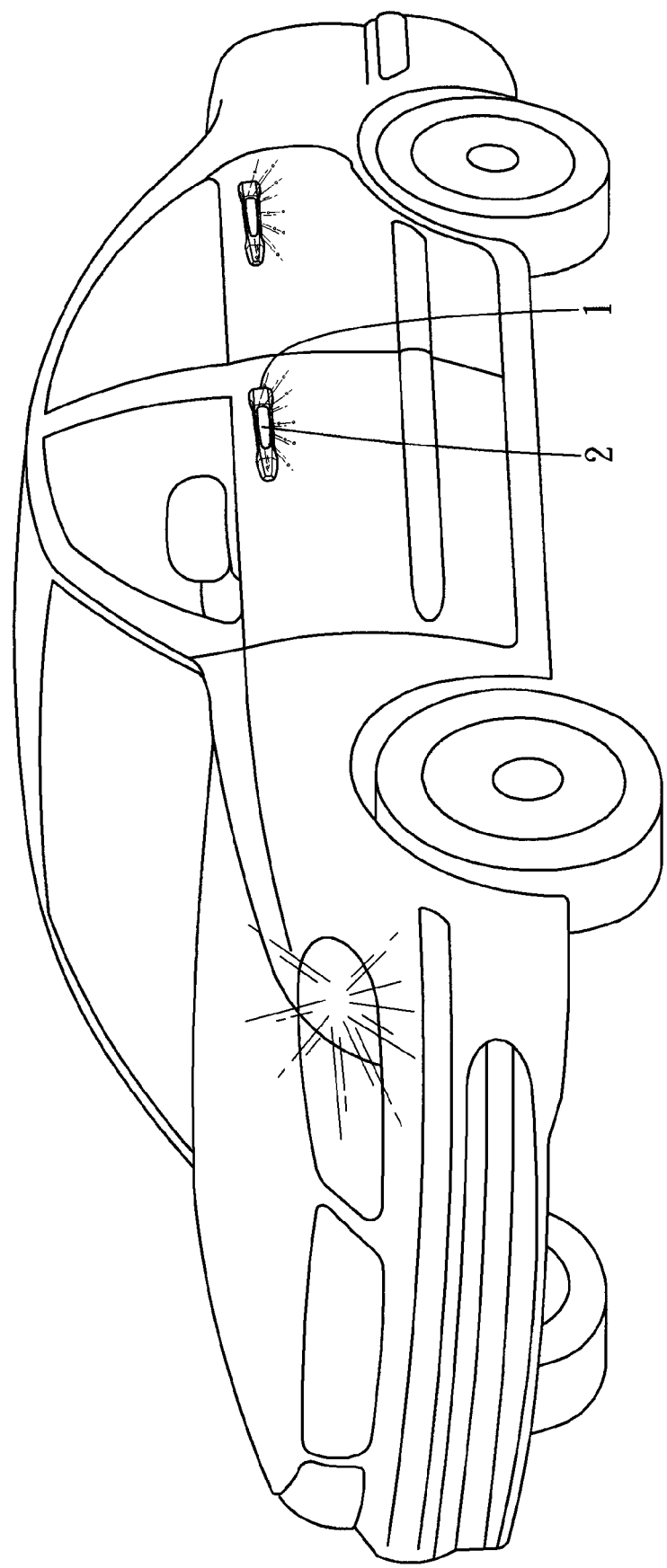
FIG. 4 shows another use of the present invention.
Figure 5:
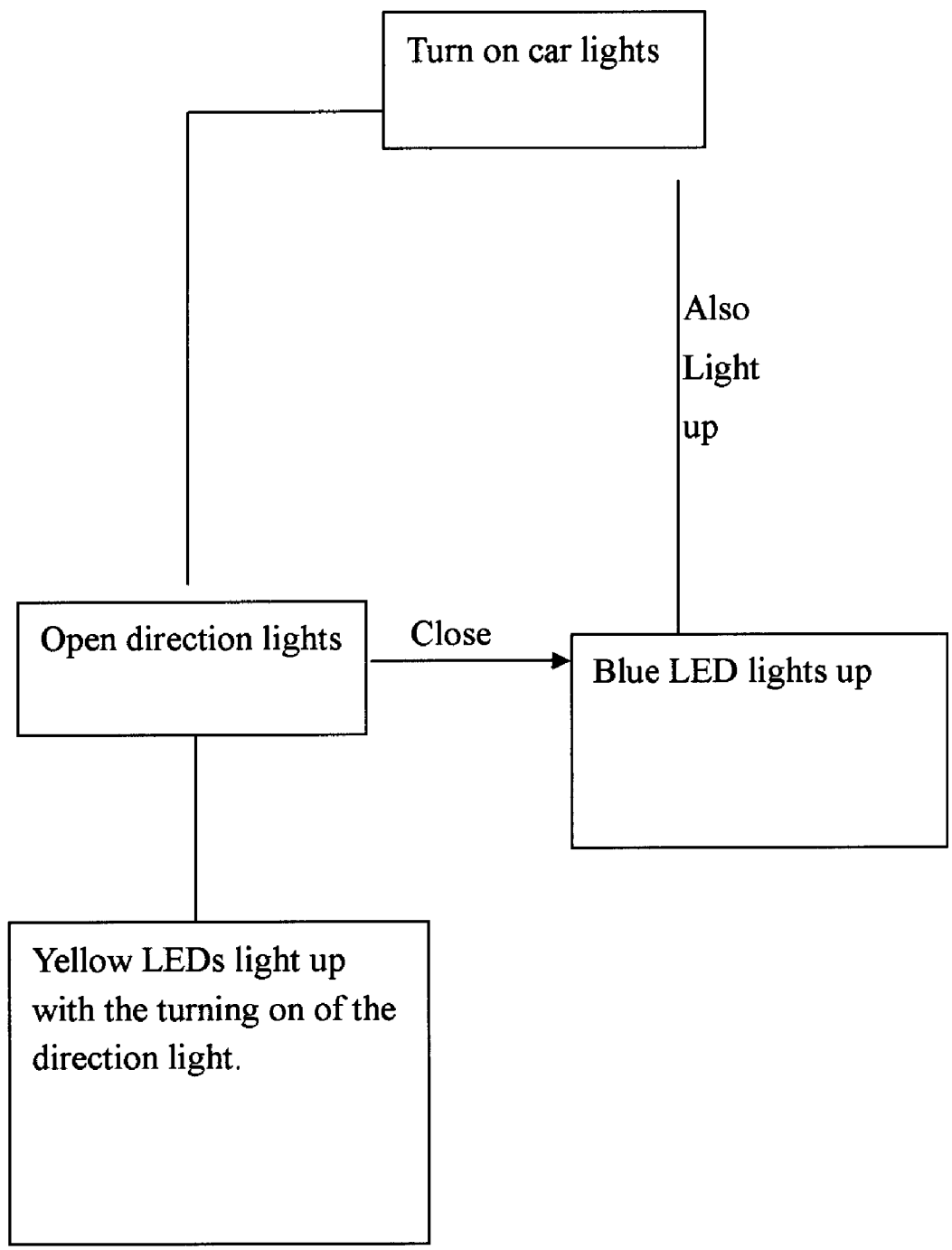
FIG. 5 is a block diagram about the use of the present invention.

Referring to FIGS. 3 to 5, when the handle is assembled to a door of a car and when the lamp of the car is turned on, the lighting emitting bodies 221 of the light emitting device 2 (blue LED lights) light up to show the lateral side of the car. When the direction light is opened, the lighting emitting bodies 221 of the light emitting device 2 (yellow LED lights) will flash to have the effect of alerting so that other people aside or near the car can know the driving direction of the car to increase the safety in driving.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A lighting handle of a car, comprising:
   a handle body having a recess at an inner surface thereof; the recess having a long via hole at a middle section thereof; each of two ends of the recess having a post;

a light emitting device being installed at an inner side of the recess of the handle body; the light emitting device including:
- a seat installed with a supporting surface; one side of the supporting surface being formed with an inserting groove; each of two ends of the supporting surface having a combining hole which is screwed by the post in the recess by using a screw;
- a circuit board installed on the supporting surface of the seat; the combining hole being corresponding to the inserting groove of the supporting surface; the circuit board being installed with a plurality of lighting emitting bodies; the circuit board having a power wire for connecting other electric circuit in a car; and
- a transparent lamp cover installed on the seat; an inner wall of the cover being a reflecting surface; one side of the cover having a protrusion which has passed through the through hole of the circuit board to be inserted into the inserting groove of the seat.

2. The lighting handle of a car as claimed in claim 1, wherein each lighting emitting body is an LED lamp.

3. The lighting handle of a car as claimed in claim 1, wherein the LED lamps include blue lamps and yellow lamps.

* * * * *